(12) United States Patent
Hopkins et al.

(10) Patent No.: US 10,821,685 B2
(45) Date of Patent: Nov. 3, 2020

(54) SEMI-RIGID FRAME FOR LARGE VACUUM BAG DEPLOYMENT IN COMPOSITE MANUFACTURING

(71) Applicant: The Boeing Company, Chicago, IL (US)

(72) Inventors: Andrew M. Hopkins, Salt Lake City, UT (US); Todd S. Trujillo, West Jordan, UT (US); John R. Henry, Sandy, UT (US)

(73) Assignee: THE BOEING COMPANY, Chicago, IL (US)

( * ) Notice: Subject to any disclaimer, the term of this patent is extended or adjusted under 35 U.S.C. 154(b) by 210 days.

(21) Appl. No.: 16/042,954

(22) Filed: Jul. 23, 2018

(65) Prior Publication Data

US 2020/0023596 A1 Jan. 23, 2020

(51) Int. Cl.
*B29C 70/54* (2006.01)
*B29C 70/34* (2006.01)

(52) U.S. Cl.
CPC ............ *B29C 70/54* (2013.01); *B29C 70/342* (2013.01)

(58) Field of Classification Search
CPC .................. B29C 70/54; B29C 70/342; B29C 2035/0211; B29C 35/02; B29C 70/44
See application file for complete search history.

(56) References Cited

U.S. PATENT DOCUMENTS

| 5,328,540 A | 7/1994 | Clayton et al. | |
| 5,464,341 A * | 11/1995 | Tachibana | B27D 1/083 425/388 |
| 5,484,277 A * | 1/1996 | Lindsay | B29C 70/44 425/388 |
| 9,914,269 B2 | 3/2018 | Hopkins et al. | |
| 2008/0211130 A1* | 9/2008 | Rydin | B29C 33/405 264/102 |
| 2011/0121487 A1* | 5/2011 | Topping | B29C 70/543 264/258 |
| 2012/0145702 A1 | 6/2012 | Miller et al. | |
| 2017/0246816 A1 | 8/2017 | Hopkins et al. | |
| 2017/0246817 A1 | 8/2017 | Hopkins et al. | |

* cited by examiner

*Primary Examiner* — Christopher T Schatz
*Assistant Examiner* — Cynthia L Schaller
(74) *Attorney, Agent, or Firm* — MH2 Technology Law Group LLP

(57) ABSTRACT

A tensioning system that can be used with a heater blanket and a vacuum bag for heating a workpiece can include a tensioner including at least one flexible rod. The tensioner can further include an end cap positioned on one or both ends of the flexible rod. The tensioner can be inserted through one or more sleeves attached to the vacuum bag, and each end of the flexible rod can be positioned within a pocket and thereby attached to the vacuum bag. In one implementation, the flexible rod can be rotated relative to the one or more end caps to decrease or increase a length of the tensioner, and the length of the tensioner is thereby adjustable. The tension applied to the vacuum bag can mitigate sealing of a seal of the vacuum bag with a layup mandrel.

21 Claims, 7 Drawing Sheets

SEMI-RIGID FRAME FOR LARGE VACUUM BAG DEPLOYMENT IN COMPOSITE MANUFACTURING

TECHNICAL FIELD

The present teachings relate to tensioning systems and, more particularly, to a tensioning system that may be used to maintain a shape of a heating blanket assembly and/or a vacuum bag assembly during the manufacture of, for example, large laminated composite materials.

BACKGROUND

A susceptor is a material that converts electromagnetic energy to thermal energy and may be used to heat various materials during, for example, a manufacturing process. A "smart" susceptor is a susceptor assembly that is self-regulating with regard to temperature. Typically, the smart susceptor is placed in an electromagnetic flux field that is generated by an inductor. An electrical resistance of the susceptor material decreases as a temperature of the susceptor material approaches a leveling temperature and, once a leveling temperature is reached, further heating of the susceptor material ceases. As the susceptor cools, electrical resistance of the susceptor increases and heating begins again. Thus a stable leveling temperature of the susceptor material can be maintained. Susceptor materials include various ferromagnetic materials, for example ferrous nickel-cobalt alloys such as Kovar®, as well as other alloys of iron, nickel, and cobalt.

A smart susceptor assembly is one type of heater structure that can be used to heat a laminated composite material such as a plurality of composite plies or sheets of carbon fiber that are pre-impregnated with an uncured resin, also known as a prepreg. Before and/or during the heating, a vacuum can be applied to the prepreg to remove air from between the plies to debulk the prepreg. The application of the vacuum can include placing the prepreg on a layup mandrel, positioning a vacuum bag over the prepreg, placing one or more smart susceptor blankets over the vacuum bag, then pumping air from the vacuum bag and thus from between the prepreg plies. The layup mandrel can be contoured, where the prepreg conforms to the contours of the layup mandrel to shape the completed structure from the prepreg.

Improving the heating and debulking process of materials such as prepregs would be desirable.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation, a heater assembly for heating a workpiece includes a vacuum bag, a tensioning system, and a heater blanket positioned between the vacuum bag and the workpiece. The tensioning system includes a plurality of sleeves attached to the vacuum bag, wherein the plurality of sleeves at least partially define a plurality of channels, a flexible rod that extends through the plurality of channels, wherein an end of the flexible rod is affixed to the vacuum bag, and a tension adjuster configured to selectively increase and decrease a tension applied to the vacuum bag by the tensioning system.

Optionally, the end of the flexible rod can be threaded, and the tensioning system can further include a threaded end cap threaded onto the end of the flexible rod and a pocket attached to the vacuum bag, wherein the pocket at least partially defines a recess, the threaded end cap is at least partially positioned within the recess during use of the tensioning system, and the pocket affixes the end of the flexible rod to the vacuum bag. A length of the tensioning system can be configured to be adjustable by rotating the flexible rod relative to the threaded end cap, thereby adjusting a tension applied to the vacuum bag by the tensioning system. The plurality of sleeves and the pocket can be or include a fiberglass-reinforced silicone attached to the vacuum bag with an adhesive. The flexible rod can be or include fiberglass and can have a diameter of from 0.25 inches to 0.5 inches.

Optionally, the heater assembly can further include a threaded end cap having a hole therethrough, wherein the end of the flexible rod is loosely positioned within the hole and a threaded tensioning screw threaded into the threaded end cap. In an implementation, the end of the flexible rod can physically contact the threaded tensioning screw and the tension applied to the vacuum bag by the tensioning system can be adjustable by rotating the threaded tensioning screw. The heater assembly can further include an end sleeve and an adhesive that attaches the threaded end cap to the vacuum bag and prevents rotation of the threaded end cap during an adjustment of the tension applied to the vacuum bag by the tensioning system.

The heater assembly can further include a seal positioned around a perimeter of the vacuum bag, a layup mandrel, and a workpiece positioned on the layup mandrel adjacent to the vacuum bag, wherein the seal physically contacts the layup mandrel. The heater assembly can optionally include a vacuum system and at least one vacuum line attached at a first end to the vacuum bag and at a second end to the vacuum system, wherein the vacuum system is configured to apply a vacuum to the workpiece positioned adjacent to the vacuum bag during a heating of the workpiece by the heater blanket.

In another implementation, a method for heating a workpiece includes inserting a flexible rod of a tensioner through a channel at least partially defined by a sleeve attached to a vacuum bag, affixing a first end of the flexible rod to the vacuum bag, adjusting the tensioner to adjust a tension applied to the vacuum bag by the tensioner, placing a seal positioned around a perimeter of the vacuum bag in physical contact with a layup mandrel, applying a vacuum to the workpiece, wherein the workpiece is positioned between the layup mandrel and a heater blanket, and heating the workpiece using the heater blanket while applying the vacuum to the workpiece.

Optionally, the adjusting of the tensioner can include rotating the flexible rod, and can further include inserting a first threaded end cap threaded onto to the first end of the flexible rod into a first recess of a first pocket attached to the vacuum bag, inserting a second threaded end cap attached to a second end of the flexible rod into a second recess of a second pocket attached to the vacuum bag, and adjusting a length of the tensioner during the rotating of the flexible rod.

Optionally, the method can further include inserting the first end of the flexible rod into a threaded hole defined by a threaded end cap attached to the vacuum bag, thereby affixing the first end of the flexible rod to the vacuum bag, and rotating a tensioning screw threaded onto the threaded end cap, wherein the tensioning screw physically contacts the first end of the flexible rod, thereby adjusting the tensioner to adjust the tension applied to the vacuum bag by the tensioner. The inserting of the flexible rod can further include inserting a fiberglass rod having a diameter of from 0.25 inches to 0.5 inches through the channel, and can include inserting the flexible rod through the channel at least partially defined by a fiberglass-reinforced sleeve attached to the vacuum bag with an adhesive.

In an implementation, the adjusting of the tensioner can further adjust a tension applied to the seal by the tensioner.

In another implementation, a method for forming an aircraft component includes slidably securing a flexible rod of a tensioner to a vacuum bag at a position between a first end and a second end of the flexible rod, affixing the first end and the second end of the flexible rod to the vacuum bag, adjusting the tensioner to adjust a tension applied to the vacuum bag by the tensioner, placing a seal positioned around a perimeter of the vacuum bag in physical contact with a layup mandrel, applying a vacuum to a prepreg positioned on the layup mandrel, wherein the prepreg is positioned between the layup mandrel and a heater blanket, and heating the prepreg using the heater blanket while applying the vacuum to the prepreg to debulk the prepreg.

Optionally, the affixing of the first end of the flexible rod to the vacuum bag can include inserting a first threaded end cap threaded onto to the first end of the flexible rod into a first recess of a first pocket attached to the vacuum bag, and the adjusting of the tensioner to adjust the tension applied to the vacuum bag by the tensioner can include adjusting a length of the tensioner by rotating the flexible rod. The affixing of the first end of the flexible rod to the vacuum bag can optionally include inserting the first end of the flexible rod into a threaded hole defined by a threaded end cap attached to the vacuum bag, and the adjusting of the tensioner to adjust the tension applied to the vacuum bag by the tensioner can include rotating a tensioning screw that is threaded onto the threaded end cap and which physically contacts the first end of the flexible rod. The slidably securing can include inserting a fiberglass rod having a diameter of from 0.25 inches to 0.5 inches through a channel defined by a fiberglass-reinforced silicone sleeve attached to the vacuum bag.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
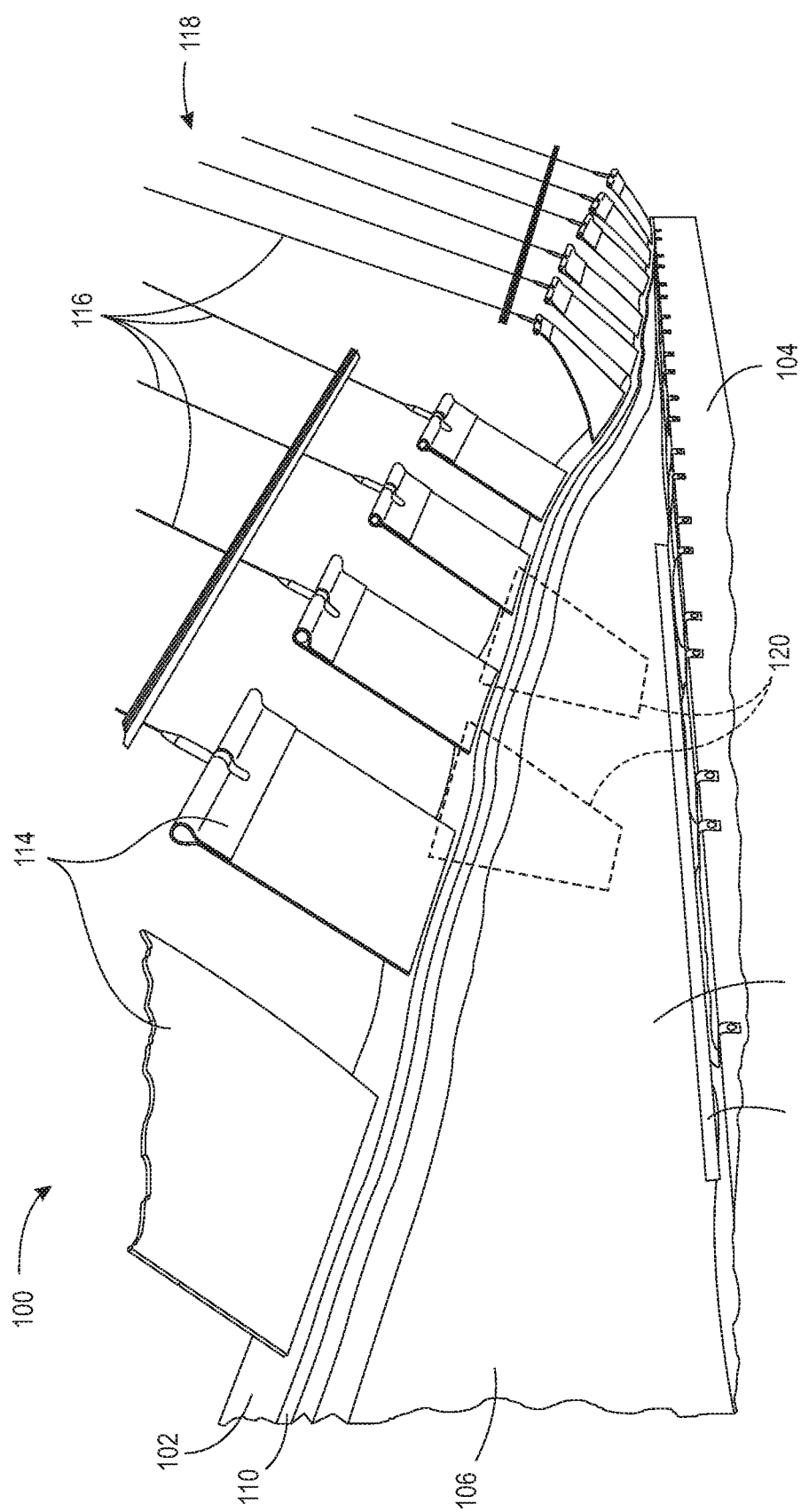
FIG. 1 is a perspective view depicting an underside of a heater blanket that is part of a heater assembly and a workstation in accordance with an implementation of the present teachings.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever convenient, the same reference numbers will be used throughout the drawings to refer to the same or like parts.

As described above, smart susceptors are a valuable tool in the manufacture of structures from, for example, laminated composite materials such as carbon sheets that are pre-impregnated with a curable resin. The structures manufactured from these laminated composite materials can be or include, but are not limited to, various large aircraft panels or other aircraft components. As the physical dimensions of the panels being manufactured increase, the physical dimensions of the layup mandrel, vacuum bag or "membrane," and smart susceptor blankets must also increase.

Prior to heating of the prepreg, a heater assembly that includes one or more heater blankets and the vacuum bag which overlies the heater blanket is lowered using, for example, a winch and/or pulley assembly onto the prepreg using a plurality of cables that are attached to lift straps secured around two sides of the heater assembly. A release film can be positioned between the heater blanket and the resin-impregnated carbon fiber composite to prevent contamination of the heater blanket and vacuum bag by resin from the carbon fiber composite. The heater assembly overlies the prepreg and the layup mandrel, and a seal positioned around the perimeter of the vacuum bag of the heater assembly physically contacts the layup mandrel. To ensure that a sufficient vacuum can be applied to the prepreg, the vacuum bag must form an airtight seal with the layup mandrel on which the prepreg rests. A vacuum is then applied through the vacuum bag, and air is removed from the prepreg through the vacuum bag to debulk the prepreg.

Very large seamless laminated composite materials require the use of very large vacuum bags and heater blankets that form the heater assembly. For example, a panel for an aircraft stabilizer can be 40 feet long and 8 feet wide, requiring a vacuum bag and heater blanket of a similar size. However, large heater assemblies, particularly heater assemblies that are not supported by a frame, are prone to collapsing and wrinkling. Wrinkles or "bow waves" (hereinafter, wrinkles) formed at the perimeter of the vacuum bag create channels between the heater assembly and the layup mandrel that allow air to flow under the vacuum bag and into the space where the prepreg is located when a vacuum force is applied to the prepreg. An insufficient vacuum results in air remaining between the plies of the prepreg and a deficient debulk or cure of the prepreg. In an attempt to ensure a proper vacuum, personnel (e.g., two or more technicians) can position weights to flatten the perimeter of the heater assembly to establish physical contact and a seal with the layup mandrel, which can be a time consuming and expensive process.

An implementation of the present teachings provides a subsystem for decreasing or eliminating wrinkles from a heater assembly. The subsystem can include a tensioning system that reduces or prevents wrinkles from forming along two or more edges of a vacuum bag and/or heater blanket. The tensioning system can improve the processing of a workpiece by reducing the leakage of air into the vacuum bag and/or around the prepreg during processing of the workpiece.

Figure 2:
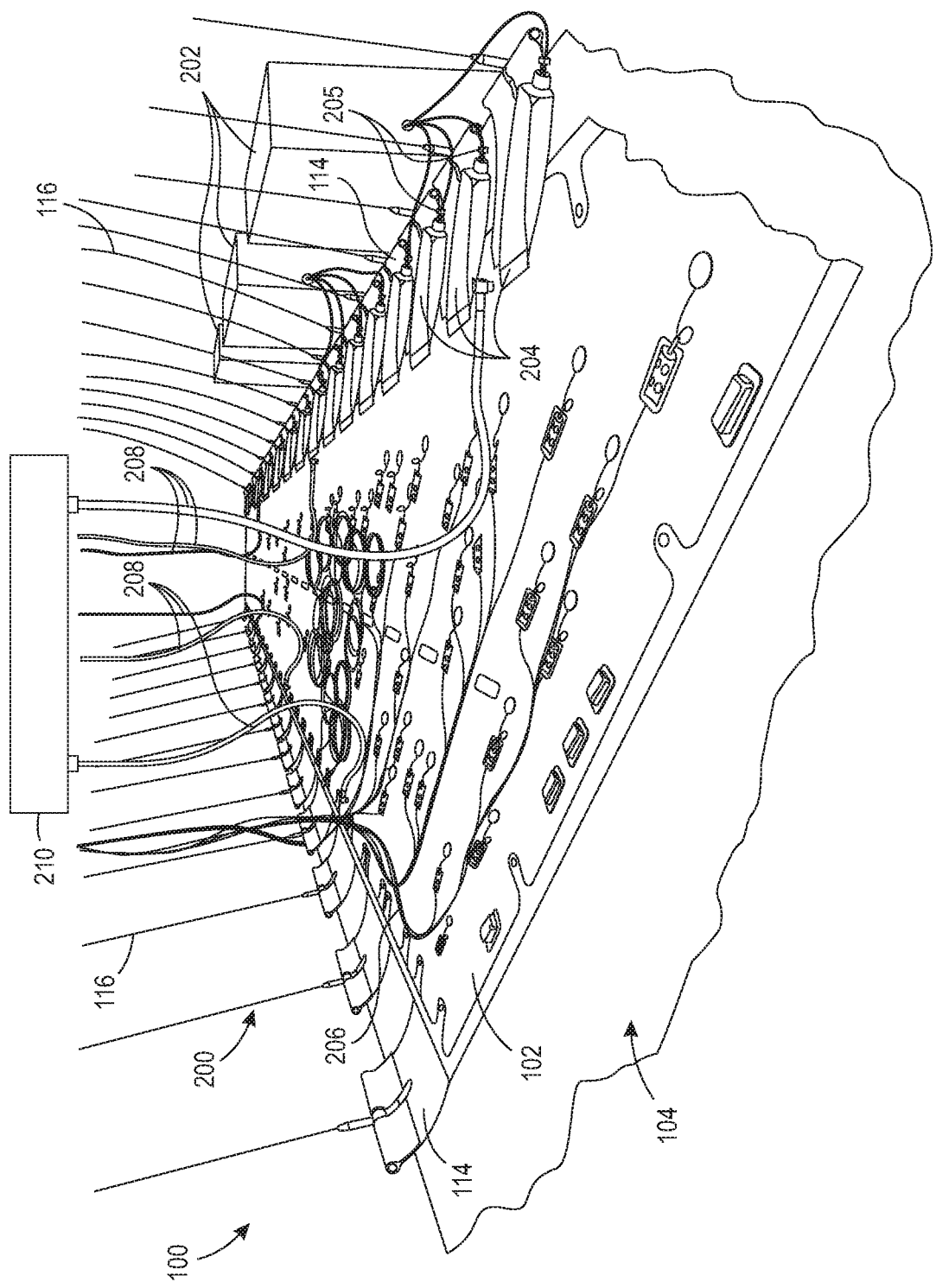
FIG. 2 is another perspective view of the heater assembly of FIG. 1.

FIGS. 1 and 2 are perspective depictions of a workstation 100 including a heater blanket 106 and a layup mandrel 104. It will be understood that the layup mandrel 104 may include a layer such as a release layer positioned over a contoured base which, for purposes of this description, is referred to collectively as the layup mandrel 104. Further, the heater blanket 106 may be or include one or more smart susceptor heater blankets. The layup mandrel 104 can include one or more contours (not individually depicted for simplicity) that assist to mold or shape a workpiece 112 during the heating as described herein. Also depicted is a vacuum bag 102 attached to, and positioned over, the heater blanket 106. FIG. 1 depicts an underside 108 of the heater blanket 106 as the heater blanket 106 and vacuum bag 102 are being lowered onto (or removed from) the layup mandrel 104. It will be appreciated that the heater blanket 106 can include two or more heater blankets assembled together, for example, depending on considerations with regard to power, size, shape, etc. of the blanket, and is described herein with reference to a single heater blanket for simplicity. The vacuum bag 102 generally extends along the length of the heater blanket 106 and the workpiece 112 being heated.

Further depicted is a seal 110 extending around a perimeter of the vacuum bag 102 that physically contacts the layup mandrel 104 when the vacuum bag 102 is fully lowered onto the layup mandrel 104 to form an air seal. Preferably, the seal 110 forms an airtight seal between the vacuum bag 102 and the layup mandrel 104, although some leakage of air between the vacuum bag 102 and the layup mandrel 104 is allowable if a sufficient vacuum can be formed around the workpiece 112 that is positioned on the layup mandrel 104 between the vacuum bag 102, heater blanket 106, and the layup mandrel 104 to perform the desired task (e.g., debulk of the workpiece 112).

A plurality of lifting straps 114 are attached at the perimeter of the vacuum bag 102, and a plurality of cables 116 are attached to the plurality of lifting straps 114. The plurality of lifting straps 114 and cables 116 are part of a lifting system 118, which can further include, for example, a supporting frame, a winch, and a plurality of pulleys (not depicted for simplicity).

FIG. 2 depicts a smart susceptor system 200 that includes one or more power supplies 202. The smart susceptor system 200 further includes electrical connectors 204 that may be high-current capable, and electrical cables 205 that may be part of, and/or that electrically connect to, the heater blanket 106. The electrical cables 205 may facilitate electrical coupling or connection of the power supplies 202 to the electrical connectors 204. Power from the power supplies 202 power one or more litz wires (not individually depicted for simplicity) of the heater blanket 106. The litz wires function as an induction coil that generates a magnetic flux field which influences a susceptor material wrapped around the litz wire to heat. The smart susceptor system 200 can include other subsystems such as a thermocouple subsystem 206 to monitor a temperature at various points across the smart susceptor system 200. Other smart susceptor systems are known in the art and are not further discussed in detail herein.

FIG. 2 further depicts vacuum lines 208 attached at a first end to the vacuum bag 102. In one implementation, the vacuum lines 208 are used to apply a vacuum force through the vacuum bag 102, thereby evacuating air from around and/or within the workpiece 112, through the vacuum lines 208. The vacuum lines 208 can be attached at a second end to an industrial vacuum system 210 that is configured to apply a vacuum to the vacuum lines 208, and thus evacuates the air from around and/or within the workpiece 112 when the workpiece 112 is positioned adjacent to the heater blanket 106 between the layup mandrel 104 and the vacuum bag 102.

As discussed above, the vacuum bag 102 heretofore can have a tendency to form wrinkles, for example, at regions 120 and/or other regions, possibly from stresses placed on the vacuum bag 102 by the lifting straps 114 as the vacuum bag 102 is lowered onto the layup mandrel 104. Wrinkles at the seal 110 can provide an air channel that prevents the formation of a vacuum around the workpiece 112.

Figure 3:
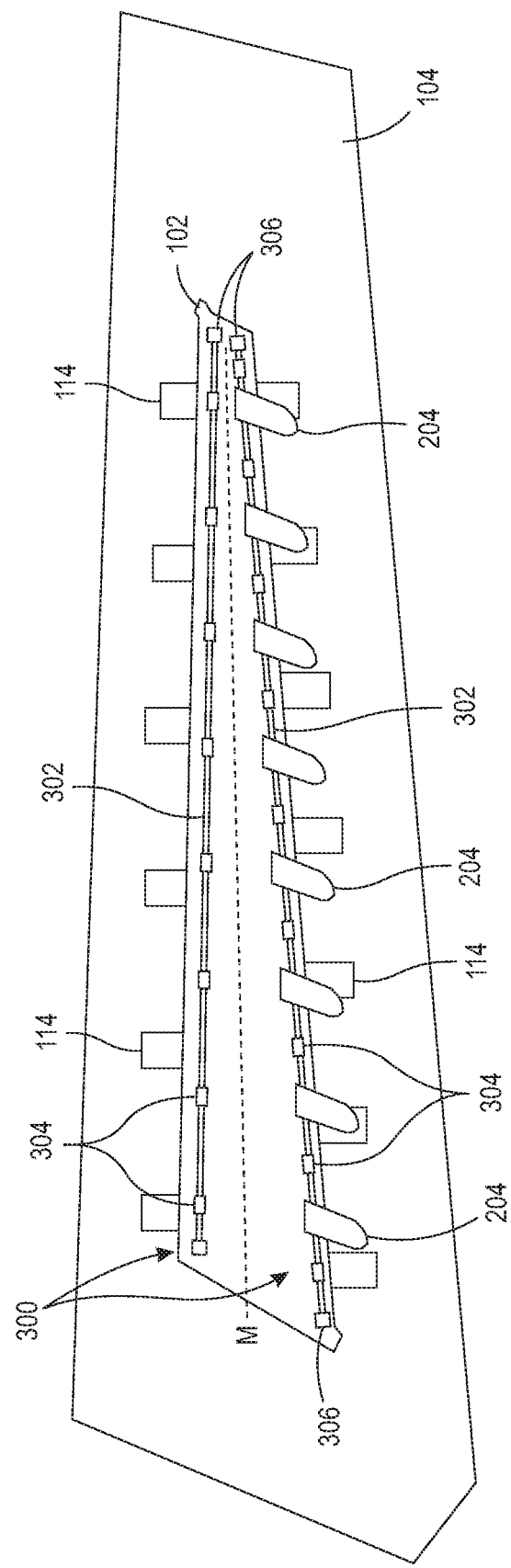
FIG. 3 is a plan view of the FIG. 2 structure including a tensioning system.

To reduce or prevent such wrinkles, a tensioning system 300 as depicted in the plan view of FIG. 3 can be employed to maintain a tensional stress on the vacuum bag 102 as it is lowered onto the layup mandrel 104. The tensioning system 300 maintains the tensional stress during the application of the vacuum and during the heating of the workpiece 112. During testing, the tensional stress has been found to mitigate wrinkling of the seal 110 of the vacuum bag 102, and thus to improve the vacuum seal provided by the seal 110 without the aid of operators or technicians.

The depicted implementation of the tensioning system 300 includes one or more tensioners 302. The tensioners 302 may extend along, or be proximate to, one or more edges of the vacuum bag 102 as depicted. In other implementations, other tensioners 302 may be positioned at other locations in place of, or in addition to, the depicted tensioners 302, for example, along or near a longitudinal midline "M" of the vacuum bag 102. This implementation of the tensioning system 300 further includes a plurality of sleeves 304 and a plurality of pockets 306 that maintain the position of the tensioners 302 relative to the vacuum bag 102 and that secure the tensioners 302 to the vacuum bag 102. The pockets 306 affix the ends of the tensioners 302 to the vacuum bag. The sleeves 304 slidably secure the tensioners 302 to the vacuum bag 102 such that the tensioner 302 can slide or move within channels 502 (FIG. 5) that are defined by the sleeves 304 in a longitudinal direction relative to the tensioners 302. The sleeves 304 and pockets 306 may be attached to the vacuum bag 102 using a fastener as described below.

Figure 4:
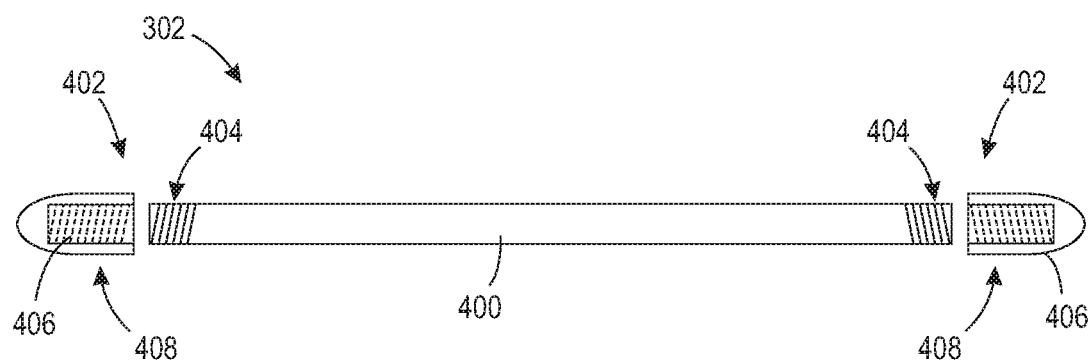
FIG. 4 is a side view of a tensioner in accordance with an implementation of the present teachings.

FIG. 4 is a plan view of a tensioner 302 according to an example implementation of the present teachings. The depicted tensioner 302 can include a flexible rod 400 and at least one tension adjuster 402.

The flexible rod 400 can be or include, for example, a flexible fiberglass rod. The flexible rod 400 can have a diameter that is suitable for the tension to be applied to the vacuum bag. In an implementation, the flexible rod 400 can have a diameter of from about 0.25 inches to about 0.5 inches, for example, about 0.375 inches. A flexible rod 400 with an insufficient diameter can result in excessive flexing with may not prevent wrinkling of the vacuum bag 102, and may further result in breakage of the flexible rod 400. A flexible rod 400 with an excessive diameter may not sufficiently conform to contours of the layup mandrel 104 and may therefore not prevent wrinkling of the vacuum bag 102. A length of the flexible rod 400 will vary depending on the application for which it is being used. The flexible rod 400 can be flexible in a direction generally perpendicular to an axis through the length of the flexible rod 400. As discussed above, the layup mandrel 104 can be contoured such that the workpiece 112 (e.g., a prepreg) conforms to the contours of the layup mandrel 104 to shape the completed structure from the workpiece 112. The lateral flexibility allows the flexible rod 400 to conform to the shape of the layup mandrel 104 such that a linear contour of the seal 110 can match or approximate the contour of the layup mandrel 104. The one or more tensioners 302 thus form a semi-rigid frame that may be used, for example, with large vacuum bag deployment during the manufacture of a composite structure such as an aircraft component, other vehicle component, or another article or workpiece.

The tensioner 302 depicted in FIG. 4 includes two tension adjusters 402 positioned at opposite ends of the flexible rod 400, although only one tension adjuster or more than two tension adjusters (for example, a mid-rod or telescoping tension adjuster with two end-of-rod tension adjusters) for each tensioner 302 are contemplated. Each tension adjuster 402 includes threads 404 that form a threaded end of the flexible rod 400 and an end cap 406 including threads 408 to provide a threaded end cap 406. The end cap 406 can be formed from, for example, a synthetic polymer such as nylon or another suitable material.

As depicted in FIG. 4, the threads 408 of each end cap 406 secure the end cap 406 to the matching threads 404 at the end of the flexible rod 400. The threads 404 at opposite ends of the flexible rod 400 can be oriented in opposite directions. Upon rotation of the flexible rod 400 about a longitudinal axis, both caps either move toward or away from the flexible rod 400 to either decrease (shorten) or increase (lengthen) a length of the tensioner 302, depending on the direction of rotation of the flexible rod 400, thereby decreasing or increasing a tensional stress placed on the heater assembly. Other types of tension adjusters 402 are contemplated. For example, the flexible rod 400 can include a telescoping mechanism (not individually depicted for simplicity), and the tension adjusters 402 may include a locking mechanism to prevent inadvertent adjustments to tensioner 302 length. A locking mechanism is discussed below relative to FIG. 9.

Figure 5:
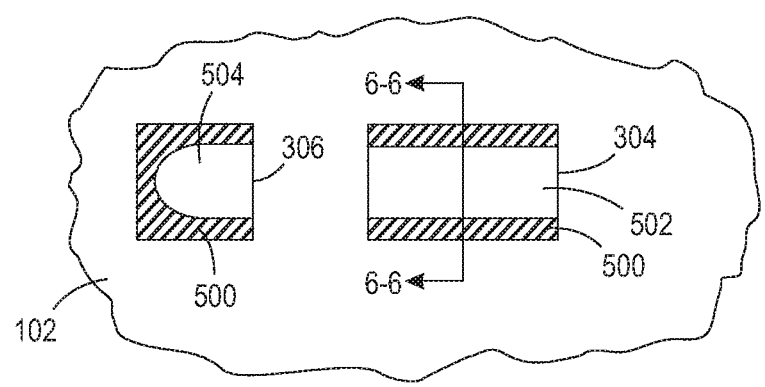
FIG. 5 is a plan view of a sleeve and a pocket attached to a heater blanket in accordance with an implementation of the present teachings.
Figure 6:
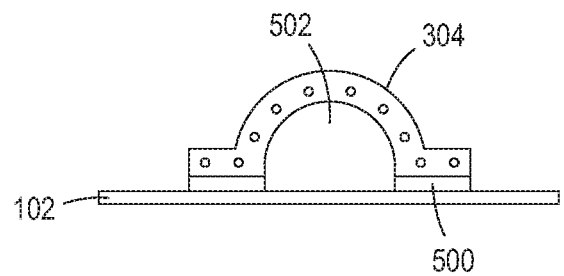
FIG. 6 is a cross section of the FIG. 5 sleeve along 6-6.
Figure 7:
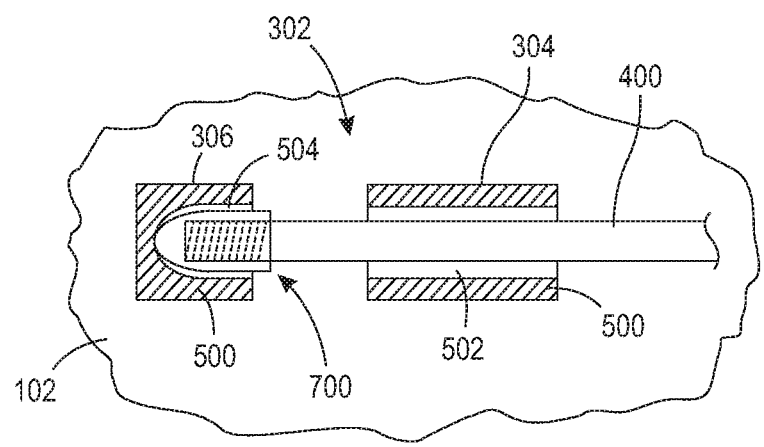
FIG. 7 depicts part of a tensioning system in accordance with an implementation of the present teachings.

FIG. 5 depicts detail of the FIG. 3 structure, including the vacuum bag 102, one of the sleeves 304, and one of the pockets 306. FIG. 6 is a cross section of the sleeve 304 along 6-6 of FIG. 5. The sleeves 304 and pockets 306 can be formed from a sheet of material that has a sufficient strength and pliability to maintain a position of the tensioner 302 without damage. In an example implementation, the sleeves 304 and pockets 306 can be or include a synthetic material such as fiberglass-reinforced silicone, for example, DSP1564-7038-032-36 available from Diversified Silicone Products, Inc. of Santa Fe Springs, Calif., or another suitable material. The sleeves 304 and pockets 306 can be adhered to the heater blanket 106 using a suitable fastener 500, for example, an adhesive silicone sealant such as RTV108 silicone sealant available from Momentive Performance Materials of Chino, Calif., that is or has been cured using a suitable curing process. Other suitable fasteners 500 are contemplated, for example, a hook and loop fastener or machine stitching that is sealed to prevent leakage of air into the heater assembly during the application of a vacuum force. FIG. 7 depicts the tensioner 302 positioned on the vacuum bag 102. The flexible rod 400 of the tensioner 302 is inserted through, and positioned within, a channel 502 that extends through, and is at least partially defined by, the sleeve 304. The end cap 406 of the tensioner 302 is inserted into, and positioned within, a concave recess 504 at least partially defined by the pocket 306, wherein the pocket is open at one end to define the concave recess 504. As depicted in FIG. 7, a portion 700 of the end cap 406 can protrude from the pocket 306 so that personnel can prevent rotation of the end cap 406 during a tension adjustment using a tool, for example, a wrench positioned on flat spots milled onto the end cap 406. The end cap can optionally be secured within the pocket 306 using an adhesive (not individually depicted for simplicity).

In this implementation, the length of the tensioner 302, and thus the tension that it places onto the vacuum bag 102, can be adjusted by rotating the flexible rod 400 clockwise and counterclockwise without rotating the caps 406. The tension exerted by the tensioner 302 onto the heater blanket 106 can be adjusted before, during, and/or after physically contacting the seal 110 with the layup mandrel 104.

Figure 8:
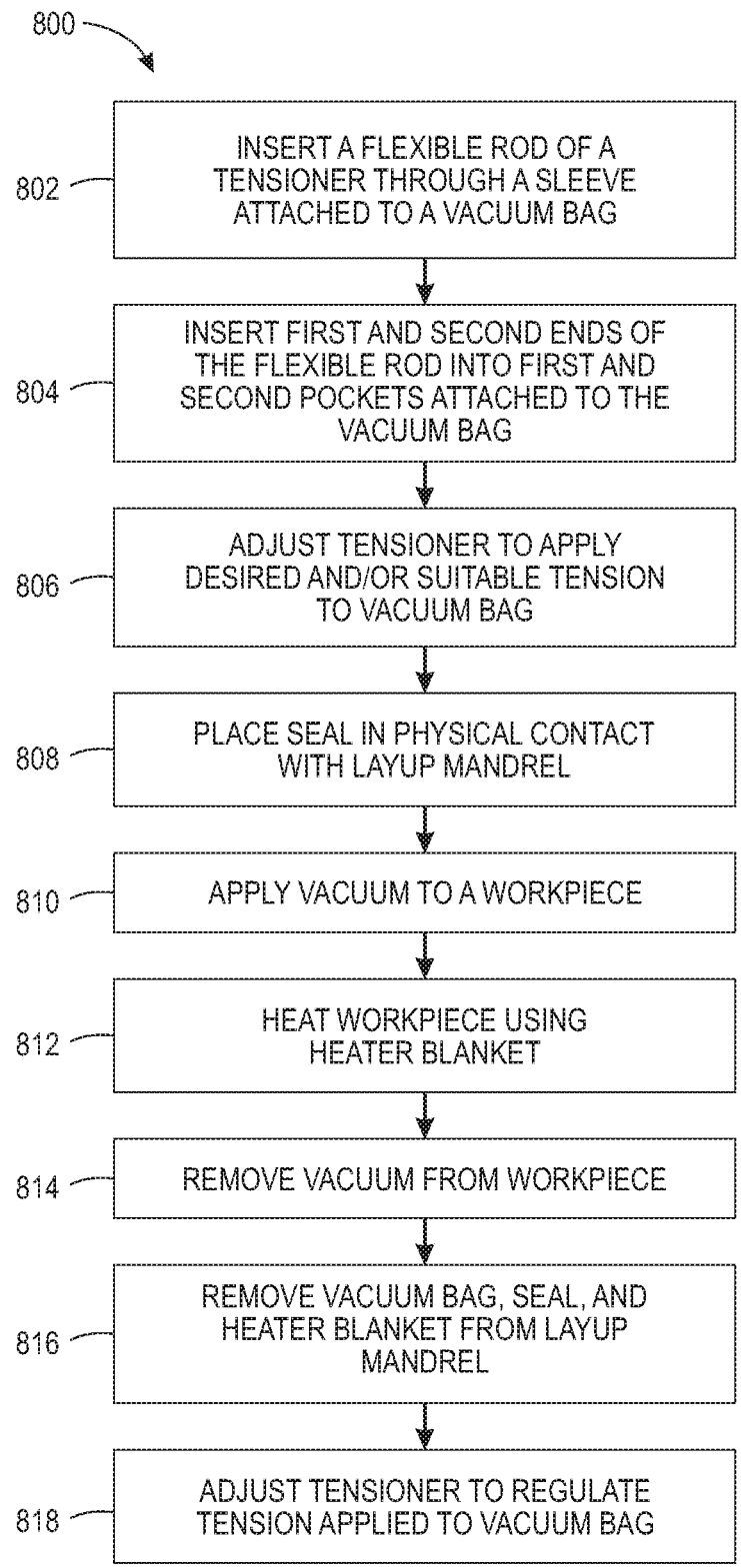
FIG. 8 is a flow chart depicting a method for heating a workpiece in accordance with the present teachings.

FIG. 8 is a flow chart depicting a method 800 for heating an article (e.g., a workpiece) according to an implementation of the present teachings. The method 800 can proceed by operation or use of one or more of the structures depicted in the figures described above, and thus is described with reference to FIGS. 1-7; however, it will be appreciated that the method 800 is not limited to any particular structure or use unless expressly stated herein. It will be appreciated that while the method 800 is described as a series of acts or events, the present teachings are not limited by the ordering of such acts or events. Some acts can occur in different orders and/or concurrently with other acts or events apart from those described herein. Further, a method in accordance with the present teachings can include other acts or events that have not been shown for simplicity, while other illustrated acts or events can be removed or modified.

As shown at 802, the method 800 can include inserting a flexible rod 400 of a tensioner 302 through a sleeve 304, where the sleeve 304 is attached to a vacuum bag 102 using, for example, a fastener 500 as described above. First and second ends of the flexible rod 400 are inserted into first and second pockets 306 as at 804. Before, during, and/or after process acts 802 and 804, the tensioner 302 can be adjusted to apply a desired or suitable tension on the vacuum bag 102 as at 806. The seal 110 is placed into physical contact with the layup mandrel 104 as at 808, and then a vacuum pressure or vacuum force is applied to the article (e.g., the workpiece 112), such as a prepreg or another workpiece as at 810 using, for example, one or more vacuum lines 208 in fluid communication with an industrial vacuum 210. Before, during, and/or after applying the vacuum to the workpiece 112 at 810, the workpiece 112 can be heated using the heater blanket 106 as at 812. Subsequently, the vacuum pressure can be removed from the workpiece 112 as at 814 and the seal 110 and vacuum bag 102 can be removed from the layup mandrel as at 816. In some implementations, the tension placed on the vacuum bag 102 by the tensioner 302 can remain between processing different workpieces to avoid reinstallation or adjustment of the tension applied to the vacuum bag 102 by the tensioning system 300. The tensioner 302 can be adjusted to regulate the tension applied to the vacuum bag 102 as at 818 as necessary to adjust for stretching or wear of the tensioning system 300 and/or vacuum bag 102, for testing purposes, or for another purpose.

It will be appreciated that a method using a tensioner as described herein may include other method acts, such as lowering and/or raising the heater blanket relative to the layup mandrel, applying a current to one or more litz wires of the heater blanket, etc. Additionally, the heater blanket, workstation, tensioner, layup mandrel, etc., can include other elements and/or features that have not been depicted for simplicity, while various elements and/or features that are depicted can be removed or modified.

Figure 9:
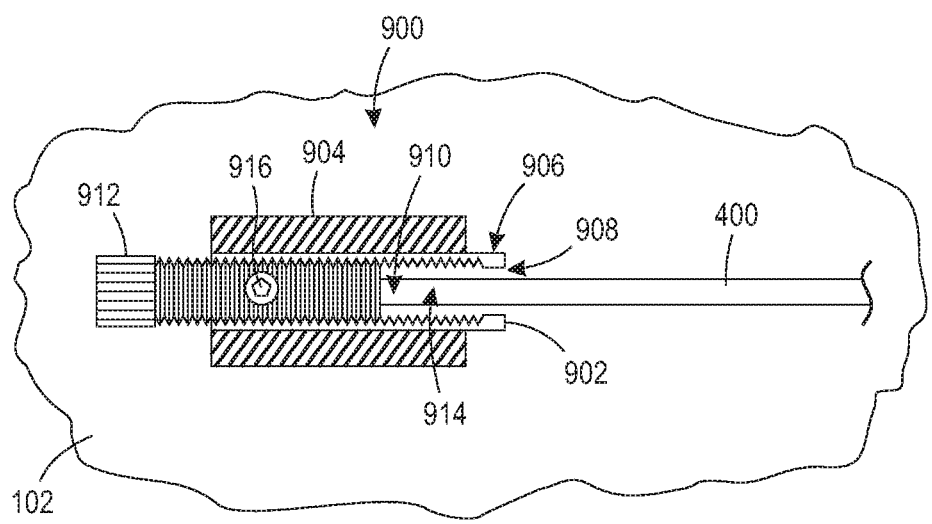
FIG. 9 is a semi-transparent plan view of a tensioning system according to another implementation of the present teachings.
Figure 10:
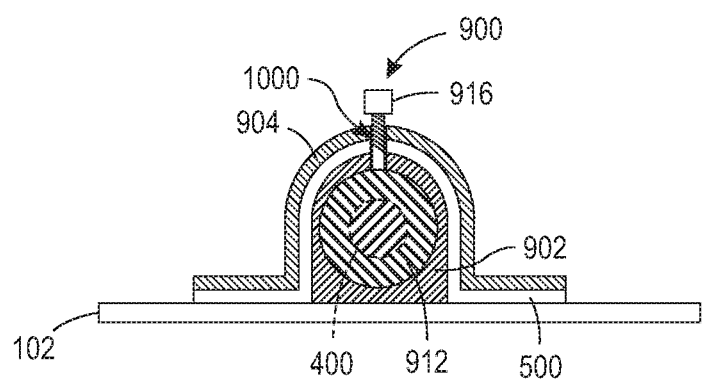
FIG. 10 is an end view of the FIG. 9 structure.

FIG. 9 is a semi-transparent plan view, and FIG. 10 is an end view from the left side of FIG. 9, depicting a tensioner 900 in accordance with another implementation of the present teachings. In this implementation, a threaded end cap 902 is positioned on, and secured to, a vacuum bag 102 using, for example, a end sleeve 904. The end sleeve 904 can be adhered to the vacuum bag 102 using an adhesive 500, thereby securing the end cap 902 to the vacuum bag 102 to prevent rotation of the end cap 902 during an adjustment of the tensioner 900. The end cap 902 can be formed from, for example, a synthetic polymer such as nylon or another suitable material. The end sleeve 904 can include a fiberglass-reinforced silicone as discussed above. A portion 906 of the end cap 902 can optionally extend or protrude from the end sleeve 904 to enable personnel to secure the end cap 902 with, for example, a tool such as a wrench during tension adjustment to prevent twisting of the end cap 902 and the end sleeve 904, which could otherwise exert excessive stress on the end sleeve 904, adhesive 500, and vacuum bag 102 during tensioning.

The end cap 902 includes a threaded hole 908 therethrough, where the hole 908 has a diameter that is larger than a diameter of the rod 400 so that a first end 910 of the rod 400 is loosely positioned within the threaded hole 908 and held in place by physical contact with the end cap 902 at a first end of the end cap 902. A second end (not individually depicted for simplicity) of the rod 400 is secured to the vacuum bag 102 using, for example, a pocket 306 (FIG. 5), another tensioner 900, or using another securing technique. The tensioner 900 further includes a threaded tensioning screw 912 that is threaded into threads 914 of the end cap 902, and a set screw 916 positioned in a hole 1000 that extends through the end sleeve 904 and the end cap 902. The portion of the hole 1000 through the end cap 902 is threaded to match threads of the set screw 916. When tightened through the hole 1000 in the end cap 902, the set screw 916 physically contacts the tensioning screw 912 and prevents rotation thereof. The first end 910 of the rod 400 physically contacts an end of the tensioning screw 912 as depicted in FIG. 9 to maintain the first end 910 of the rod 400 within the end cap 902. The end cap 902 and tensioning screw 912 thus affix the first end 910 of the rod 400 to the vacuum bag 102.

To increase a tension that the tensioning system 900 exerts on the vacuum bag 102, set screw 916 is loosened which allows the tensioning screw 912 to be rotated on the threads 914 of the end cap 902. The tensioning screw 912 is rotated so that it extends further into the threaded hole 908. This increases a force that the tensioning screw 912 exerts on the first end 910 of the rod 400. Because the second end of the rod 400 is secured to the vacuum bag 102, a tensional force is applied to the vacuum bag 102 by the rod 400 and the tensioning system 900. The tensioning screw 912 thus functions as a tension adjuster 912. Once the tensional force exerted by the tensioning system 900 on the vacuum bag 102 is at a sufficient or desired level, the set screw 916 can be rotated with sufficient force so that the set screw 916 physically contacts the tensioning screw 912 which is thereby secured into position by a locking mechanism which, in FIGS. 9 and 10, includes the set screw 916. Tightening the set screw 916 extends the set screw 916 into the hole 1000 such that it physically contacts the tensioning screw 912 and prevents inadvertent rotation of the tensioning screw 912. To adjust or readjust the tension on the vacuum bag 102, the set screw 916 is loosened and the tensioning screw 912 is rotated in the appropriate direction, either clockwise or counterclockwise, to either increase or decrease the force it exerts on the rod 400, and thus the tensional force the rod 400 exerts on the vacuum bag 102.

The technology described herein may be used to during the formation of a workpiece, such as a carbon fiber resin panel to be used, for example, part of an aerospace vehicle, military, commercial, or private flight vehicle, reusable spacecraft, ground-based vehicle systems, weapons systems, missiles, rockets, and re-entry systems. As used herein, "aircraft" refers to any vehicle capable of flight within an atmosphere, partial vacuum, and/or vacuum.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A heater assembly for heating a workpiece, comprising:
   a vacuum bag;
   a tensioning system, comprising:
      a plurality of sleeves attached to the vacuum bag, wherein the plurality of sleeves at least partially define a plurality of channels;
      a flexible rod that extends through the plurality of channels, wherein an end of the flexible rod is affixed to the vacuum bag; and
      a tension adjuster configured to engage the flexible rod to selectively increase and decrease a tension applied to the vacuum bag by the tensioning system; and
   a heater blanket positioned between the vacuum bag and the workpiece.

2. The heater assembly of claim 1, wherein the end of the flexible rod is threaded, and the tensioning system further comprises:
   a threaded end cap threaded onto the end of the flexible rod; and
   a pocket attached to the vacuum bag, wherein:
      the pocket at least partially defines a recess;
      the threaded end cap is at least partially positioned within the recess during use of the tensioning system; and
      the pocket affixes the end of the flexible rod to the vacuum bag.

3. The heater assembly of claim 2, wherein a length of the tensioning system is configured to be adjustable by rotating the flexible rod relative to the threaded end cap, thereby adjusting the tension applied to the vacuum bag by the tensioning system.

4. The heater assembly of claim 2, wherein the plurality of sleeves and the pocket comprises a fiberglass-reinforced silicone attached to the vacuum bag with an adhesive.

5. The heater assembly of claim 4, wherein the flexible rod comprises fiberglass and has a diameter of from 0.25 inches to 0.5 inches.

6. The heater assembly of claim 1, further comprising:
   a threaded end cap having a hole therethrough, wherein the end of the flexible rod is loosely positioned within the hole; and
   a threaded tensioning screw threaded into the threaded end cap, wherein:
      the end of the flexible rod physically contacts the threaded tensioning screw; and
      the tension applied to the vacuum bag by the tensioning system is adjustable by rotating the threaded tensioning screw.

7. The heater assembly of claim 6, further comprising an end sleeve and an adhesive that attaches the threaded end cap to the vacuum bag and prevents rotation of the threaded end cap during an adjustment of the tension applied to the vacuum bag by the tensioning system.

8. The heater assembly of claim 1, further comprising:
   a seal positioned around a perimeter of the vacuum bag;
   a layup mandrel; and
   a workpiece positioned on the layup mandrel adjacent to the vacuum bag, wherein the seal physically contacts the layup mandrel.

9. The heater assembly of claim 1, further comprising:
   a vacuum system; and
   at least one vacuum line attached at a first end to the vacuum bag and at a second end to the vacuum system, wherein the vacuum system is configured to apply a vacuum to the workpiece positioned adjacent to the vacuum bag during a heating of the workpiece by the heater blanket.

10. The heater assembly of claim 1, wherein the tension adjuster comprises threads and the tension adjuster is configured to selectively increase and decrease the tension applied to the vacuum bag upon a rotation of at least one of the tension adjuster or the rod relative to the other.

11. A method for heating a workpiece, comprising:
    inserting a flexible rod of a tensioner through a channel at least partially defined by a sleeve attached to a vacuum bag;
    affixing a first end of the flexible rod to the vacuum bag;
    adjusting the tensioner to adjust a tension applied to the vacuum bag by the tensioner;
    placing a seal positioned around a perimeter of the vacuum bag in physical contact with a layup mandrel;
    applying a vacuum to the workpiece, wherein the workpiece is positioned between the layup mandrel and a heater blanket; and
    heating the workpiece using the heater blanket while applying the vacuum to the workpiece.

12. The method of claim 11, wherein the adjusting of the tensioner comprises rotating the flexible rod.

13. The method of claim 12, further comprising:
    inserting a first threaded end cap threaded onto to the first end of the flexible rod into a first recess of a first pocket attached to the vacuum bag;
    inserting a second threaded end cap attached to a second end of the flexible rod into a second recess of a second pocket attached to the vacuum bag; and
    adjusting a length of the tensioner during the rotating of the flexible rod.

14. The method of claim 12, further comprising:
inserting the first end of the flexible rod into a threaded hole defined by a threaded end cap attached to the vacuum bag, thereby affixing the first end of the flexible rod to the vacuum bag; and
rotating a tensioning screw threaded onto the threaded end cap, wherein the tensioning screw physically contacts the first end of the flexible rod, thereby adjusting the tensioner to adjust the tension applied to the vacuum bag by the tensioner.

15. The method of claim 11, wherein the flexible rod is a fiberglass rod having a diameter of from 0.25 inches to 0.5 inches, and the inserting of the flexible rod comprises inserting the fiberglass rod through the channel.

16. The method of claim 11, wherein the inserting of the flexible rod further comprises inserting the flexible rod through the channel at least partially defined by a fiberglass-reinforced sleeve attached to the vacuum bag with an adhesive.

17. The method of claim 11, wherein the adjusting of the tensioner further adjusts a tension applied to the seal by the tensioner.

18. A method for forming an aircraft component, comprising:
slidably securing a flexible rod of a tensioner to a vacuum bag at a position between a first end and a second end of the flexible rod;
affixing the first end and the second end of the flexible rod to the vacuum bag;
adjusting the tensioner to adjust a tension applied to the vacuum bag by the tensioner;
placing a seal positioned around a perimeter of the vacuum bag in physical contact with a layup mandrel;
applying a vacuum to a prepreg positioned on the layup mandrel, wherein the prepreg is positioned between the layup mandrel and a heater blanket; and
heating the prepreg using the heater blanket while applying the vacuum to the prepreg to debulk the prepreg.

19. The method of claim 18, wherein:
the affixing of the first end of the flexible rod to the vacuum bag comprises inserting a first threaded end cap threaded onto to the first end of the flexible rod into a first recess of a first pocket attached to the vacuum bag; and
the adjusting of the tensioner to adjust the tension applied to the vacuum bag by the tensioner comprises adjusting a length of the tensioner by rotating the flexible rod.

20. The method of claim 18, wherein:
the affixing of the first end of the flexible rod to the vacuum bag comprises inserting the first end of the flexible rod into a threaded hole defined by a threaded end cap attached to the vacuum bag; and
the adjusting of the tensioner to adjust the tension applied to the vacuum bag by the tensioner comprises rotating a tensioning screw that is threaded onto the threaded end cap and which physically contacts the first end of the flexible rod.

21. The method of claim 18, wherein the flexible rod is a fiberglass rod having a diameter of from 0.25 inches to 0.5 inches, and the slidably securing comprises inserting the fiberglass rod through a channel defined by a fiberglass-reinforced silicone sleeve attached to the vacuum bag.

* * * * *